US007299541B2

(12) United States Patent
Ikeda et al.

(10) Patent No.: US 7,299,541 B2

(45) Date of Patent: Nov. 27, 2007

(54) CONTACT PRESS-FITTING APPARATUS

(75) Inventors: Yuji Ikeda, Kanagawa (JP); Kiyomi Maruyama, Kanagawa (JP)

(73) Assignee: Tyco Electronics AMP K.K, Kanagawa-Ken (JP)

( * ) Notice: Subject to any disclaimer, the term of this patent is extended or adjusted under 35 U.S.C. 154(b) by 354 days.

(21) Appl. No.: 11/029,986

(22) Filed: Jan. 5, 2005

(65) Prior Publication Data

US 2005/0155220 A1 Jul. 21, 2005

(30) Foreign Application Priority Data

Jan. 5, 2004 (JP) ............................ 2004-000485

(51) Int. Cl.
*B23P 13/00* (2006.01)

(52) U.S. Cl. ............................ 29/747; 29/748; 29/736; 29/884; 140/147

(58) Field of Classification Search .......... 29/745-755, 29/832-834, 739, 33 M; 439/79-83, 751, 439/733; 140/102, 147
See application file for complete search history.

(56) References Cited

U.S. PATENT DOCUMENTS

| | | | | |
|---|---|---|---|---|
| 5,366,381 A * | 11/1994 | Kile | ............................ | 439/79 |
| 5,400,502 A * | 3/1995 | Ota et al. | ...................... | 29/845 |
| 5,453,016 A * | 9/1995 | Clark et al. | .................... | 439/79 |
| 5,499,443 A * | 3/1996 | Ota et al. | ...................... | 29/741 |
| 6,883,229 B2 * | 4/2005 | Schuppert, Jr. | .............. | 29/747 |
| 7,048,552 B2 * | 5/2006 | Sakata et al. | ................. | 439/79 |

FOREIGN PATENT DOCUMENTS

| | | |
|---|---|---|
| CA | 2 361 452 | 8/2000 |
| DE | 199 04 574 A1 | 8/2000 |
| FR | 2 785 727 A1 | 5/2000 |
| JP | 08-069828 | 3/1996 |
| JP | 2003-068419 | 3/2003 |

* cited by examiner

*Primary Examiner*—Minh Trinh
(74) *Attorney, Agent, or Firm*—Barley Snyder LLC

(57) ABSTRACT

It is an object of the present invention to provide a contact press-fitting apparatus which can perform the press-fitting of all of the contacts with high reliability, without leading to problems such as buckling of the contacts, even in cases where the array pitch of the contacts is uneven. The contact press-fitting apparatus comprises a supporting member which is inserted into the press-fitting head from a direction perpendicular to the press-fitting direction of the press-fitting head, and which supports the side surfaces of the contacts on the sides that the abutting part does not abut against.

11 Claims, 14 Drawing Sheets

CONTACT PRESS-FITTING APPARATUS

FIELD OF THE INVENTION

The present invention relates to a contact press-fitting apparatus comprising a press-fitting head which respectively positions and press-fits L-shaped legs of a plurality of contacts in a board.

BACKGROUND

A technique in which the legs of a connector holding numerous contacts, each contact having a substantially L-shaped leg, are respectively positioned and press-fitted in a board has been practiced in the past.

Conventionally, the method shown in FIG. 13 (see JP8-69828A), for example, has been known as a contact press-fitting method in which substantially L-shaped legs of numerous contacts are respectively positioned and press-fitted in a board.

In FIG. 13, the connector 100 comprises a housing 110 and numerous contacts 120 which are disposed in this housing 110 in the form of a matrix having a plurality of rows and a plurality of columns (three rows and a plurality of columns in the example shown in the figure). Furthermore, each contact 120 has a substantially L-shaped leg 121, a press-fitting part 122 that is disposed in the vicinity of the lower end of this leg 121, and a shoulder 123 that is disposed on the upper end of the press-fitting part 122. Moreover, all of the contacts 120 are press-fitted in a board (not shown in the figure) by pressing the shoulders 123 of the respective contacts 120 from above by means of a contact press-fitting apparatus not shown in the figure.

Furthermore, the method shown in FIGS. 14A and 14B (see JP2003-68419A), for example, has been known as another contact press-fitting method in which substantially L-shaped legs of numerous contacts are respectively positioned and press-fitted in a board.

In FIGS. 14A and 14B, the connector 200 comprises a housing 210 and numerous contacts 220A and 220B that are disposed in the form of a matrix having a plurality of rows and a plurality of columns (two rows and a plurality of columns in the figure). Furthermore, each of the contacts 220A in the upper rank has a substantially L-shaped leg 221A that protrudes rearward (toward the right in FIG. 14A) from the housing 210, and this leg 221A has a horizontal part 222A that extends horizontally rearward from the housing 210, and a press-fitting part 223A that is bent downward from the horizontal part 222A. Moreover, each of the contacts 220B of the lower rank also comprises a substantially L-shaped leg 221B that protrudes rearward from the housing 210, and this leg 221B has a horizontal part 222B that extends horizontally rearward from the housing 210, and a press-fitting part 223B that is bent downward from the horizontal part 222B. Meanwhile, a plurality of leg accommodating slits 231 that accommodate the legs 221A and 221B of the contacts 220A and 220B at the time of press-fitting, and a housing pressing part 232 that can press the rear-end upper surface of the housing 210 from above at the time of press-fitting, are disposed in a contact press-fitting jig 230. Furthermore, recesses 231A and 231B that can accommodate the respective legs 221A and 221B when the contact press-fitting jig 230 is moved in a direction perpendicular to the press-fitting direction are formed in the inside surfaces of the respective leg accommodating slits 231.

Furthermore, when the press-fitting parts 223A and 223B of the contacts 220A and 220B are press-fitted in the press-fitting holes 241A and 241B of the board 240, the contact press-fitting jig 230 is first caused to approach the board 240 from the rear or from above, and the legs 221A and 221B of the contacts 220A and 220B are caused to advance into the leg accommodating slits 231 of the contact press-fitting jig 230. Then, the ceiling surfaces of the leg accommodating slits 231 are caused to contact the horizontal parts 222A of the contacts 220A in the upper rank, and the rear-end inside surfaces of the leg accommodating slits 231 are caused to contact the press-fitting parts 223A of the contacts 220A in the upper rank. Consequently, a state is produced in which the legs 221A of the contacts 220A in the upper rank and the legs 221B of the contacts 220B in the lower rank respectively face the recesses 231A and recesses 231B as shown in FIG. 14B. Next, from this state, the contact press-fitting jig 230 is moved in a direction perpendicular to the press-fitting direction. As a result, the leg pats 221A and 221B of the contacts 220A and 220B are fitted into the respective recesses 231A and 231B; consequently, a state is produced in which the play of the contacts 220A and 220B and contact press-fitting jig 230 in the forward-rearward direction and the vertical direction is restricted. As a result, the setting of the contact press-fitting jig 230 with respect to the connector 200 is completed; accordingly, if the contact press-fitting jig 230 is moved toward the board 240, the press-fitting parts 223A and 223B of the contacts 220A and 220B that are pressed against the contact press-fitting jig 230 are press-fitted in the press-fitting holes 241A and 241B of the board 240.

Thus, a plurality of leg accommodating slits 231 are formed in the contact press-fitting jig 230, and recesses 231A and 231B that can accommodate the respective legs 221A and 221B when the contact press-fitting jig 230 is moved in a direction perpendicular to the press-fitting direction are formed in the inside surfaces of the respective leg accommodating slits 231; accordingly, there is no need for contact shoulders above the press-fitting parts 223A and 223B in order to press-fit the respective contacts 220A and 220B.

However, in these conventional contact press-fitting methods, the following problems have been encountered.

Specifically, in the case of the method shown in FIG. 13, numerous contacts 120 are disposed on the wall surface of a housing 110 in the form of a matrix having a plurality of rows and a plurality of columns (three rows and a plurality of columns in the example shown in the figure) with respect to the wall surface, and the press-fitting parts 122 are also disposed in the same plurality of rows and plurality of columns as those described above (as seen from above). Furthermore, in the case of the method shown in FIG. 13, the method is not a method in which contacts disposed at an uneven array pitch (e.g., a case in which contacts that do not overlap with the second and third rows from the top (as seen from above) are disposed between these second and third rows with respect to the wall surface of the housing 110) are press-fitted in the board. Accordingly, in the press-fitting method shown in FIG. 13, in cases where the array pitch of the contacts 120 is uneven, there may be cases in which the shoulders 123 of the respective contacts 120 cannot be pressed from above (i.e., there may be cases in which abutting parts that press the shoulders 123 from above are not provided in the contact press-fitting apparatus), so that these contacts cannot be appropriately press-fitted.

Furthermore, in the method shown in FIGS. 14A and 14B as well, numerous contacts 220A and 220B are disposed in the form of a matrix having a plurality of rows and a plurality of columns (two rows and a plurality of columns in the example shown in the figure) on the wall surface of the housing 210, and the press-fitting parts 223A and 223B are also disposed in the same plurality of rows and plurality of columns as those described above (as seen from above). Moreover, in the case of the method shown in FIGS. 14A and 14B as well, this method is not a method for press-fitting contacts with an uneven array pitch (e.g., a case in which contacts that do not overlap with the contacts 220A of the upper rank and the contacts 220B of the lower rank (as seen from above) are disposed between these contacts 220A and 220B) in the board. Accordingly, in the press-fitting method shown in FIGS. 14A and 14B as well, in cases where the array pitch of the contacts is uneven, there may be cases in which the press-fitting of these uneven contacts is impossible.

Furthermore, in the case of the contact press-fitting method shown in FIGS. 14A and 14B, when the press-fitting parts 223A and 223B of the contacts 220A and 220B are press-fitted in the press-fitting holes 241A and 241B of the board 240, the upper end of the contact press-fitting jig 230 in a position separated from the board 240 is pressed as the force point, so that this contact press-fitting jig 230 is moved toward the board 240; moreover, the respective recesses 231A and 231B on the side of the leg accommodating slits 231 are opened in a state in which the legs 221A and 221B of the contacts 220A and 220B are fitted into the respective recesses 231A and 231B. Accordingly, when the contact press-fitting jig 230 is moved toward the board 240, there is a danger that problems such as buckling in the press-fitting parts 223A and 223B of the respective contacts 220A and 220B, destruction of the through-hole plating of the board, or tilted insertion of the press-fitting parts may occur, so that press-fitting of the contacts 220A and 220B becomes impossible.

SUMMARY

Accordingly, the present invention was devised in light of the problems described above, and it is an object of the present invention to provide a contact press-fitting apparatus which allows the press-fitting of all of the contacts with high reliability, without leading to problems such as buckling of the contacts, even in cases where the array pitch of the contacts is uneven.

In order to solve the problems described above, a contact press-fitting apparatus according to an exemplary embodiment of the present invention is provided. This contact press-fitting apparatus comprises: a board carrier which carries a board; a connector carrier which carries a connector having numerous substantially L-shaped legs with press-fitting parts disposed in the vicinity of the lower ends of the legs; and a press-fitting head which respectively positions and press-fits the legs of the connector in the board, the press-fitting head having an abutting part that abuts against shoulders disposed on the upper sides of the press-fitting parts, wherein the apparatus comprises a supporting member which is inserted into the press-fitting head from a direction perpendicular to the press-fitting direction of this press-fitting head, and which supports the side surfaces of the contacts on the sides that the abutting part does not abut against.

In the contact press-fitting apparatus of the present invention according to Claim 1, since the apparatus comprises a supporting member which is inserted into the press-fitting head from a direction perpendicular to the press-fitting direction of the press-fitting head, and which supports the side surfaces of the contacts on the sides that the abutting part does not abut against, a contact press-fitting apparatus can be provided in which the abutting part of the press-fitting head abuts against the shoulders of the contacts, and the supporting member supports the side surfaces of the contacts on the sides that the abutting part does not abut against, so that the press-fitting of all of the contacts can be performed with high reliability, and without causing any problems such as buckling of the contacts, even in cases where the array pitch of the contacts is uneven.

DETAILED DESCRIPTION OF THE EMBODIMENT(S)

Figure 1:
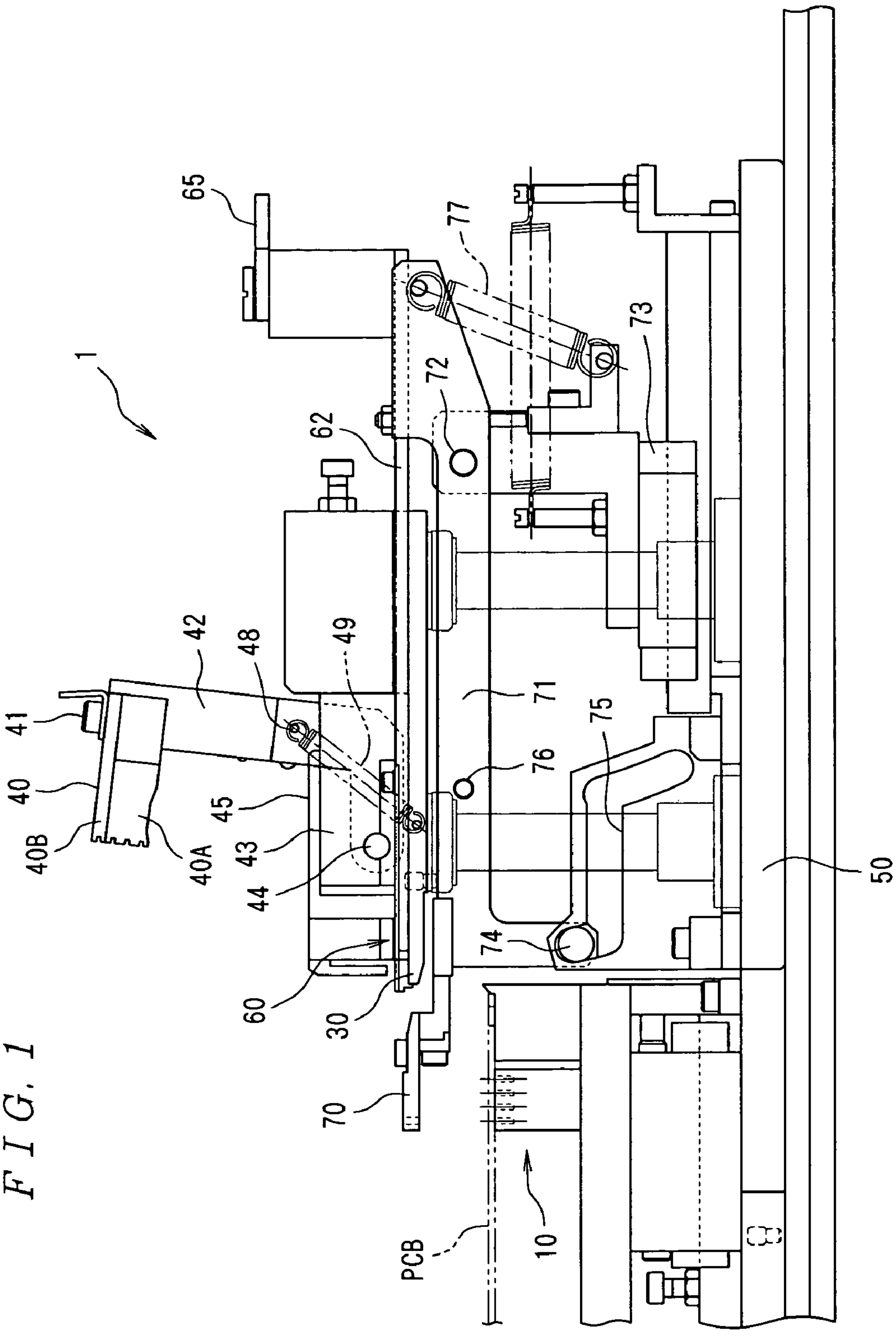
FIGS. 1-6 are sequential side views of a contact press-fitting apparatus according to an exemplary embodiment of the present invention.

Next, an embodiment of the present invention will be described with reference to the figures. In FIGS. 1 through 6, the contact press-fitting apparatus 1 comprises a board carrier 10 that carries a board PCB, a connector carrier 30 that carries a connector 20, and a press-fitting head 40.

Here, the board carrier 10 is fastened to a base 50 so that the position of the board carrier 10 in the vertical direction does not fluctuate. Furthermore, the connector carrier 30 is disposed together with an upper base 45 so that the connector carrier 30 is free to move upward and downward with respect to the base 50.

Figure 7:
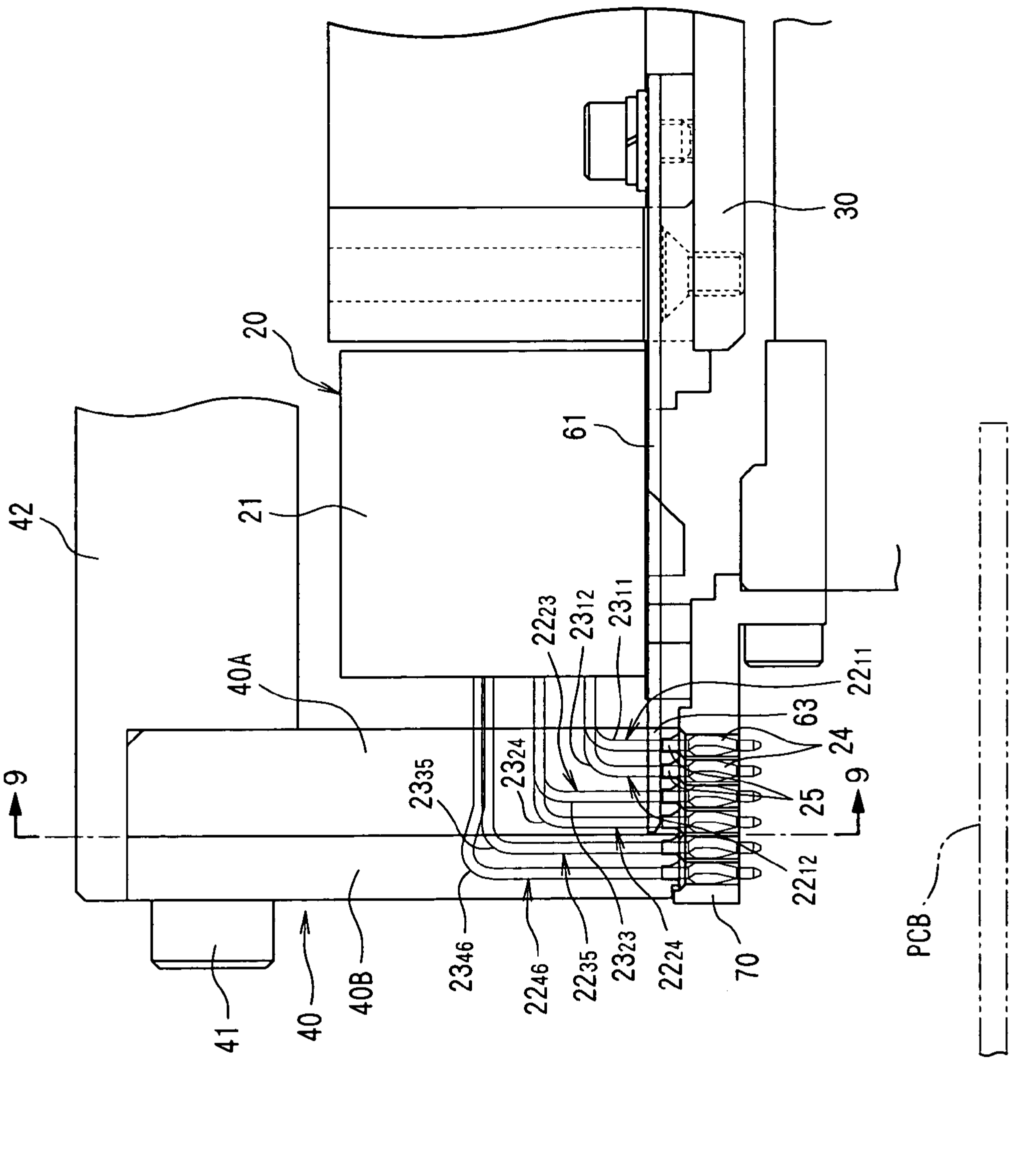
FIG. 7 is a detailed side view of the contact press-fitting apparatus of FIGS. 1-6, showing the details of the area in the vicinity of the press-fitting head in the contact press-fitting apparatus in the state shown in FIG. 2.
Figure 8:
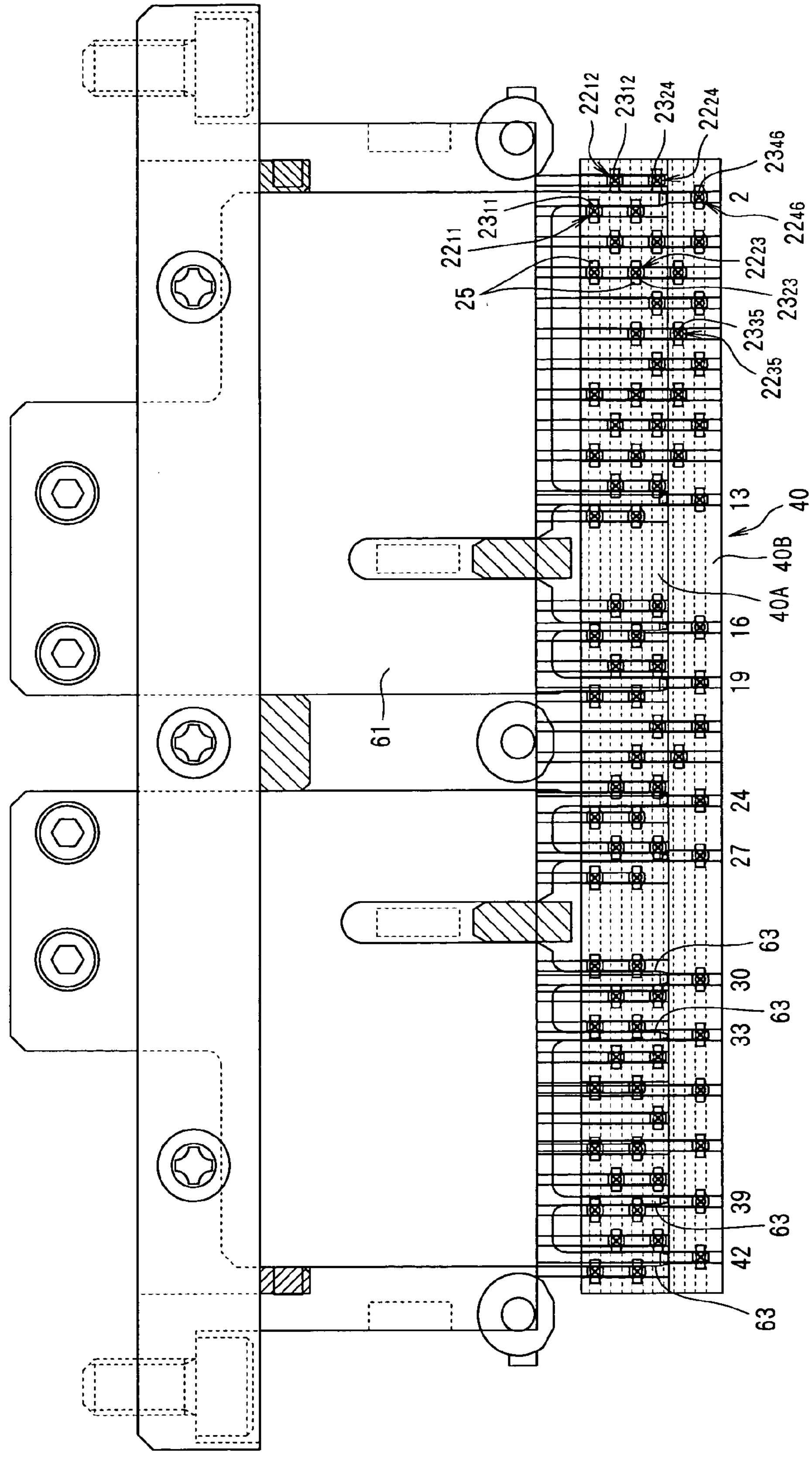
FIG. 8 is a back view of FIG. 7.
Figure 9:
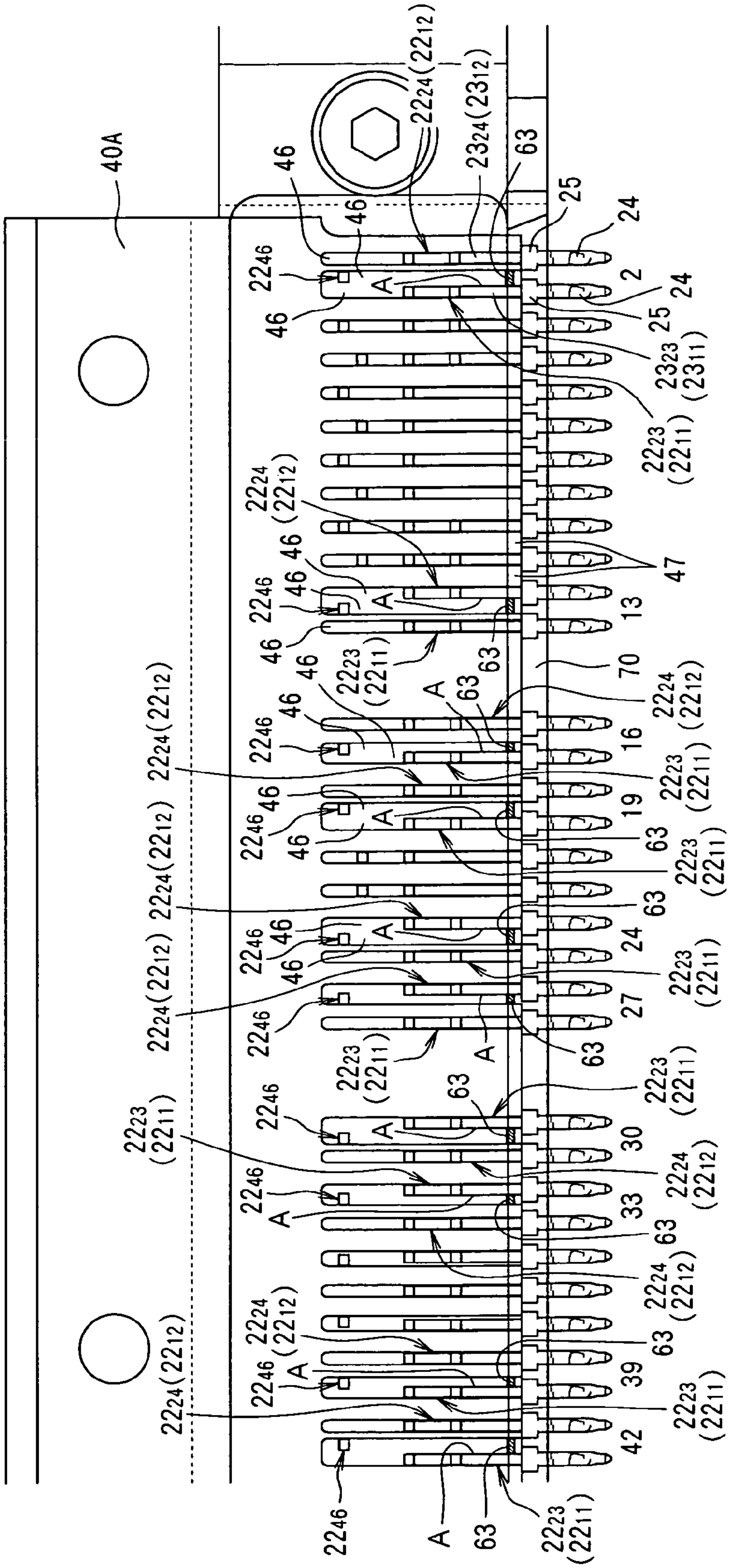
FIG. 9 is a sectional view along line 9-9 in FIG. 7.

As is shown in FIGS. 7 and 9, the connector 20 comprises a substantially rectangular housing 21 and numerous contacts $\mathbf{22}_{11}$, $\mathbf{22}_{12}$, $\mathbf{22}_{23}$, $\mathbf{22}_{24}$, $\mathbf{22}_{35}$ and $\mathbf{22}_{46}$ which are attached to this housing 21 in a plurality of rows and a plurality of columns (4 rows and 43 columns in the example shown in the figures). The contacts $\mathbf{22}_{11}$ are disposed in the first row from the bottom with respect to the wall surface of the housing 21; each of these contacts has a substantially L-shaped leg $\mathbf{23}_{11}$, and as is shown in FIG. 8, these legs $\mathbf{23}_{11}$ are disposed in the first row closest to the housing 21. The contacts $\mathbf{22}_{12}$ are disposed in the first row from the bottom with respect to the wall surface of the housing 21; each of these contacts has a substantially L-shaped leg $\mathbf{23}_{12}$, and as is shown in FIG. 8, these legs $\mathbf{23}_{12}$ are disposed in the second row from the housing 21. The contacts $\mathbf{22}_{23}$ are disposed in the second row from the bottom with respect to the wall surface of the housing 21; each of these contacts has a substantially L-shaped leg $\mathbf{23}_{23}$, and as is shown in FIG. 8, these legs $\mathbf{23}_{23}$ are disposed in the third row from the housing 21. The contacts $22_{24}$ are disposed in the second row from the bottom with respect to the wall surface of the housing 21; each of these contacts has a substantially L-shaped leg $23_{24}$, and as is shown in FIG. 8, these legs $23_{24}$ are disposed in the fourth row from the housing 21. The contacts $22_{35}$ are disposed in the third row from the bottom with respect to the wall surface of the housing 21; each of these contacts has a substantially L-shaped leg $23_{35}$, and as is shown in FIG. 8, these legs $23_{35}$ are disposed in the fifth row from the housing 21. Furthermore, the contacts $22_{46}$ are disposed in the fourth row from the bottom (uppermost row) with respect to the wall surface of the housing 21; each of these contacts has a substantially L-shaped leg $23_{46}$, and as is shown in FIG. 8, these legs $23_{46}$ are disposed in the sixth row from the housing 21.

Press-fitting parts 24 are disposed on the respective contacts $22_{11}$, $22_{12}$, $22_{23}$, $22_{24}$, $22_{35}$ and $22_{46}$ in the vicinity of the lower ends of the respective legs $23_{11}$, $23_{12}$, $23_{23}$, $23_{24}$, $23_{35}$ and $23_{46}$. Moreover, shoulders 25 that protrude in the direction of width (the left-right direction in FIG. 9) are formed on the upper sides of the press-fitting parts 24 of the respective contacts $22_{11}$, $22_{12}$, $22_{23}$, $22_{24}$, $22_{35}$ and $22_{46}$.

Meanwhile, the press-fitting head 40 is fastened to a supporting arm 42 by bolts 41. The supporting arm 42 is supported on a supporting arm holder 43 so that the supporting arm 42 is free to pivot about a pivoting shaft 44. Both sides of the supporting arm 42 and supporting arm holder 43 are covered by the upper base 45, and the supporting arm 42 and supporting arm holder 43 are supported by the upper base 45.

The press-fitting head 40 is constructed from two units, i.e., an inside head 40A which is disposed on the inside, and an outside head 40B which is disposed on the outside of the inside head 40A, as viewed from the pivoting shaft. Furthermore, as is shown in FIG. 9, longitudinal grooves 46 which are formed at substantially the same pitch as the array pitch of the contacts $22_{11}$, $22_{12}$, $22_{23}$, $22_{24}$, $22_{35}$ and $22_{46}$ are formed in the inside head 40A of the press-fitting head 40. Moreover, longitudinal grooves (not shown in the figures) which are formed at the same pitch as the array pitch of the contacts $22_{35}$ and $22_{46}$ are formed in the outside head 40B. Abutting parts 47 are disposed in the positions of the longitudinal grooves 46 facing the shoulders 25 of the respective contacts $22_{11}$, $22_{12}$, $22_{23}$, $22_{24}$, $22_{35}$ and $22_{46}$. However, in the inside head 40A, as is shown in FIG. 9, the longitudinal grooves 46 through which the legs $23_{46}$ of the contacts in the second column, thirteenth column, sixteenth column, nineteenth column, twenty-fourth column, twenty-seventh column, thirtieth column, thirty-third column, thirty-ninth column and forty-second column from the right among the contacts $22_{46}$ of the uppermost row pass form wide longitudinal grooves that respectively communicate with either the longitudinal grooves 46 through which the legs $23_{23}$ and $23_{11}$ of the adjacent contacts $22_{23}$ and $22_{11}$ pass or the longitudinal grooves 46 through which the legs $23_{24}$ and $23_{12}$ of the adjacent contacts $22_{24}$ and $22_{12}$ pass. The abutting parts 47 described above are not present in places where these wide longitudinal grooves are present. The reason for the formation of these wide longitudinal grooves is that the array pitch in the column direction (left-right direction in FIG. 9) of the legs $23_{46}$ of the contacts in the second column, thirteenth column, sixteenth column, nineteenth column, twenty-fourth column, twenty-seventh column, thirtieth column, thirty-third column, thirty-ninth column and forty-second column from the right among the contacts $22_{46}$ of the uppermost row that pass through the wide longitudinal grooves, and the legs $23_{23}$ and $23_{11}$ of the adjacent contacts $22_{23}$ and $22_{11}$ or the legs $23_{24}$ and $23_{12}$ of the adjacent contacts $22_{24}$ and $22_{12}$, is smaller than the array pitch of the legs of the other contacts, so that the contacts are disposed at an uneven array pitch.

Figure 2:
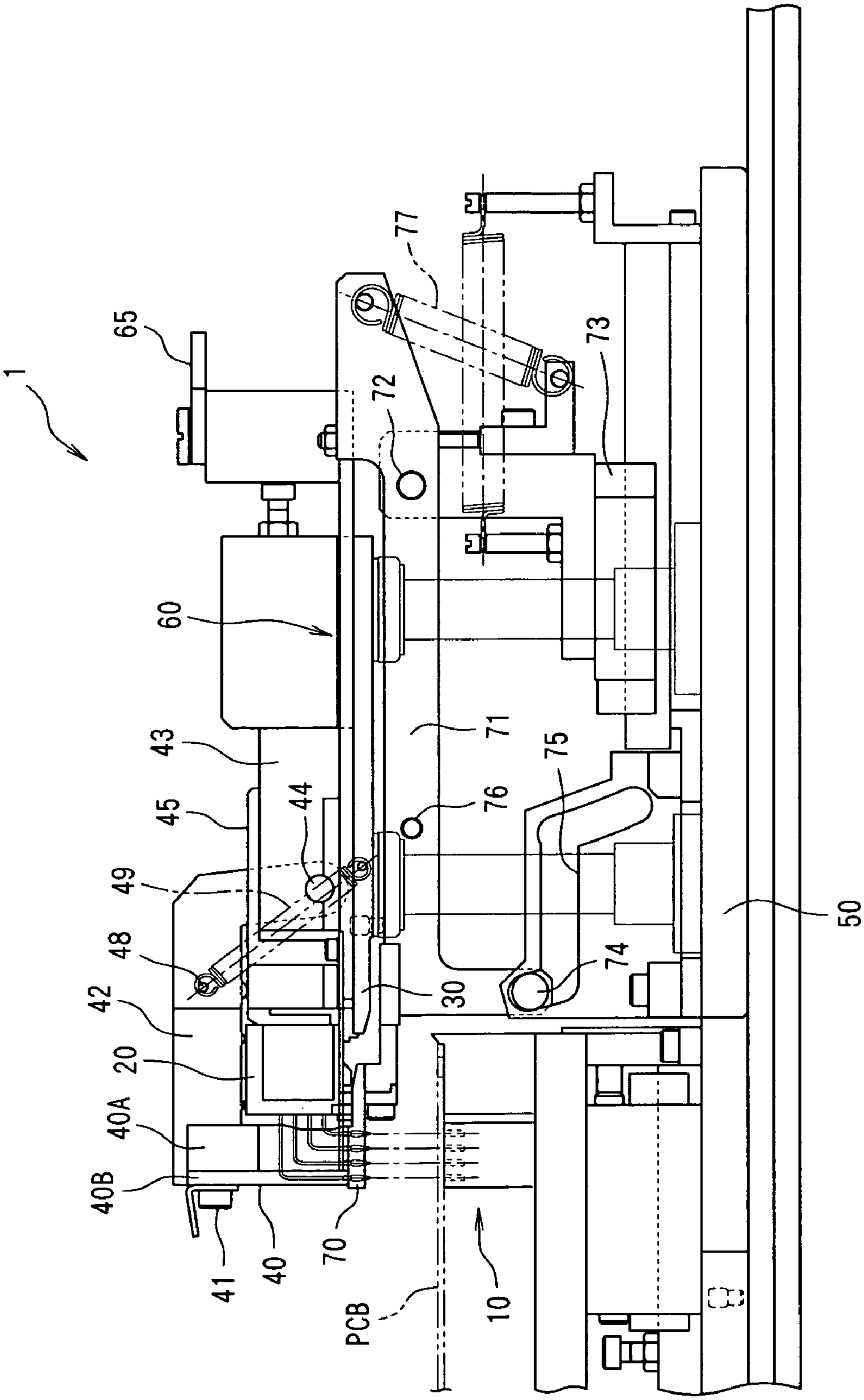

Furthermore, the supporting arm 42 to which the press-fitting head 40 is fastened is constructed so that this arm can pivot between a resting position in which the press-fitting head 40 is positioned above the connector, as shown in FIG. 1, and a press-fitting position in which the contacts $22_{11}$, $22_{12}$, $22_{23}$, $22_{24}$, $22_{35}$ and $22_{46}$ of the connector 20 are inserted into the longitudinal grooves 46 of the press-fitting head 40 (see FIG. 9) as shown in FIG. 2, and this arm 42 is stabilized in both the resting position and press-fitting position by means of coil springs 49. In this embodiment, the pivoting of the press-fitting head 40 between the resting position shown in FIG. 1 and the press-fitting position shown in FIG. 2 is accomplished by the operation of a operating rod 48 (disposed on the supporting arm 42) by the operator. Press-fitting is performed by the pressing of the upper-side surface of the supporting arm 42 in FIG. 2 by a known press-fitting press (not shown in the figures). During this press-fitting operation, the press-fitting head 40, supporting arm 42, supporting arm holder 43, upper base 45 and connector carrier 30 move upward and downward as a unit.

When press-fitting is performed by the press-fitting press, the press-fitting head 40 drops from above the respective contacts $22_{11}$, $22_{12}$, $22_{23}$, $22_{24}$, $22_{35}$ and $22_{46}$, the respective contacts $22_{11}$, $22_{12}$, $22_{23}$, $22_{24}$, $22_{35}$ and $22_{46}$ enter the longitudinal grooves 46 of the press-fitting head 40, and the abutting parts 47 contact the shoulders 25 of the respective contacts $22_{11}$, $22_{12}$, $22_{23}$, $22_{24}$, $22_{35}$ and $22_{46}$ from above. Then, these contacts $22_{11}$, $22_{12}$, $22_{23}$, $22_{24}$, $22_{35}$ and $22_{46}$ are pressed downward "as is," so that the press-fitting parts 24 of the respective contacts $22_{11}$, $22_{12}$, $22_{23}$, $22_{24}$, $22_{35}$ and $22_{46}$ are press-fitted in the press-fitting holes (not shown in the figures) of the board PCB.

During this press-fitting, as is shown in FIG. 9, since no abutting parts 47 are present in the places where the wide longitudinal grooves described above are present, there may be cases in which the contacts $22_{11}$, $22_{12}$, $22_{23}$ and $22_{24}$ fall over, so that these contacts $22_{11}$, $22_{12}$, $22_{23}$ and $22_{24}$ buckle, or so that the press-fitting parts are inserted at an inclination.

Figure 10:
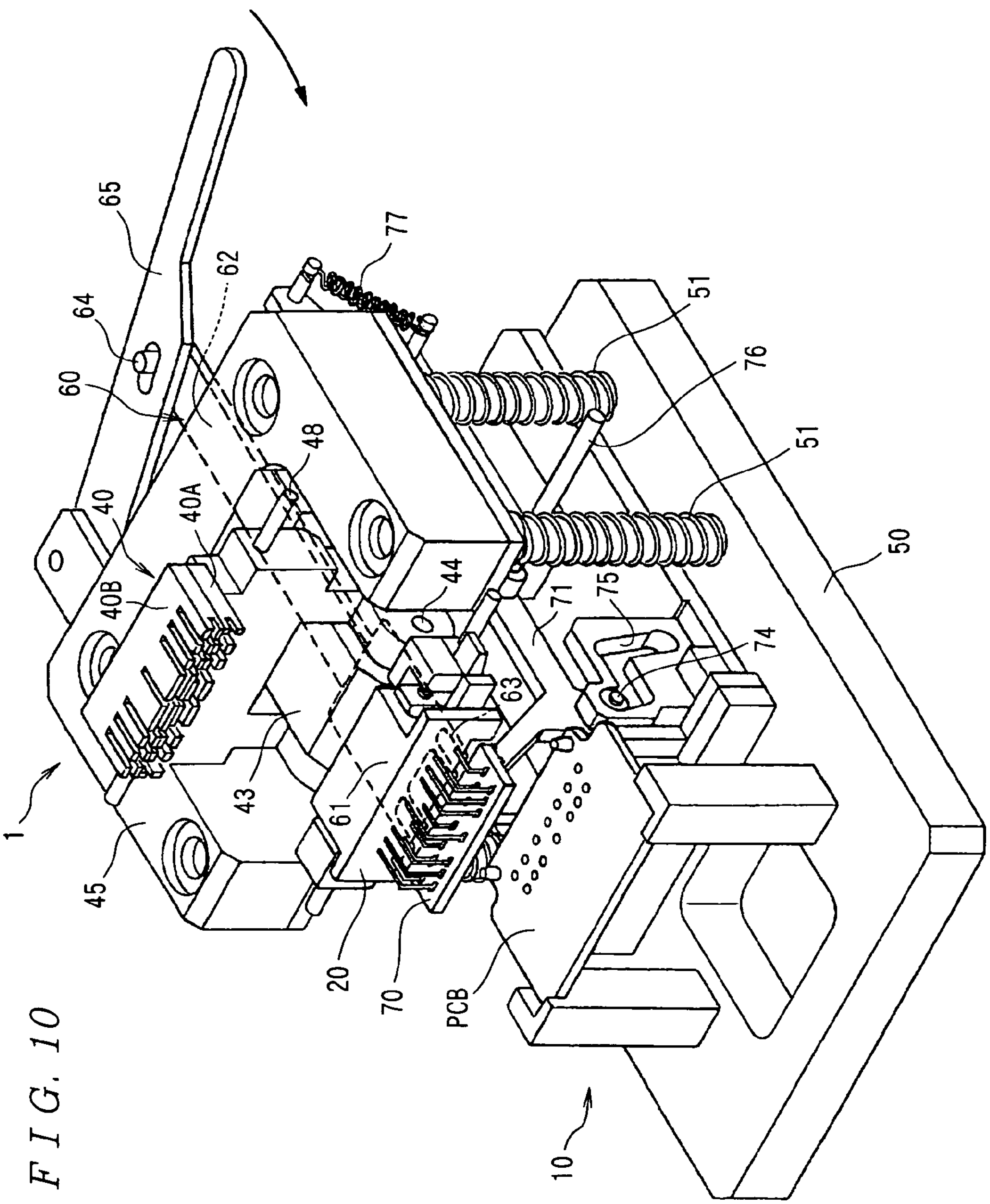
FIG. 10 is a perspective view of the contact press-fitting apparatus shown in side views in FIGS. 1 through 6.
Figure 11:
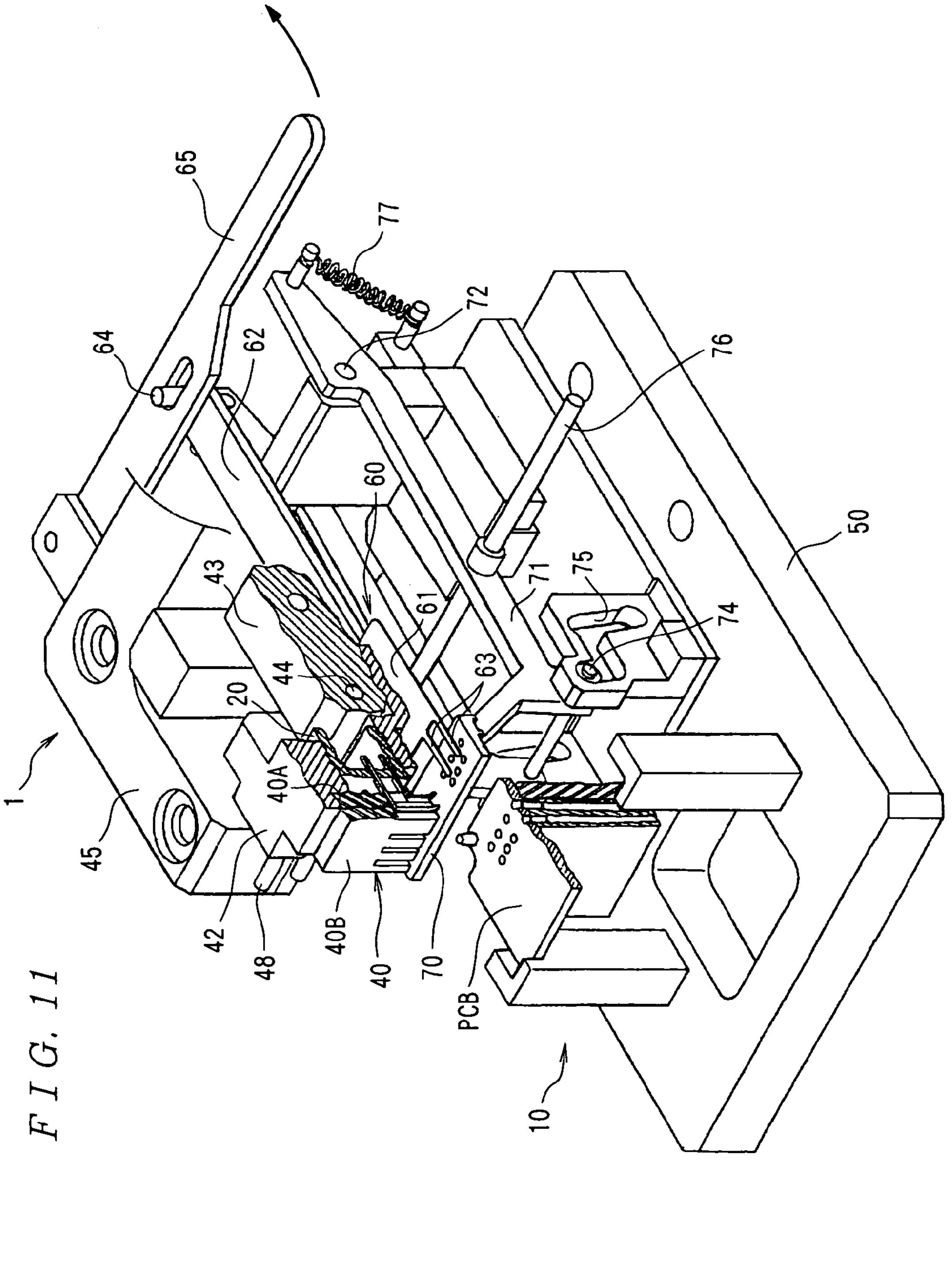
FIG. 11 is a perspective view, partially in section, of the contact press-fitting apparatus of FIGS. 1-6 prior to press-fitting.
Figure 12:
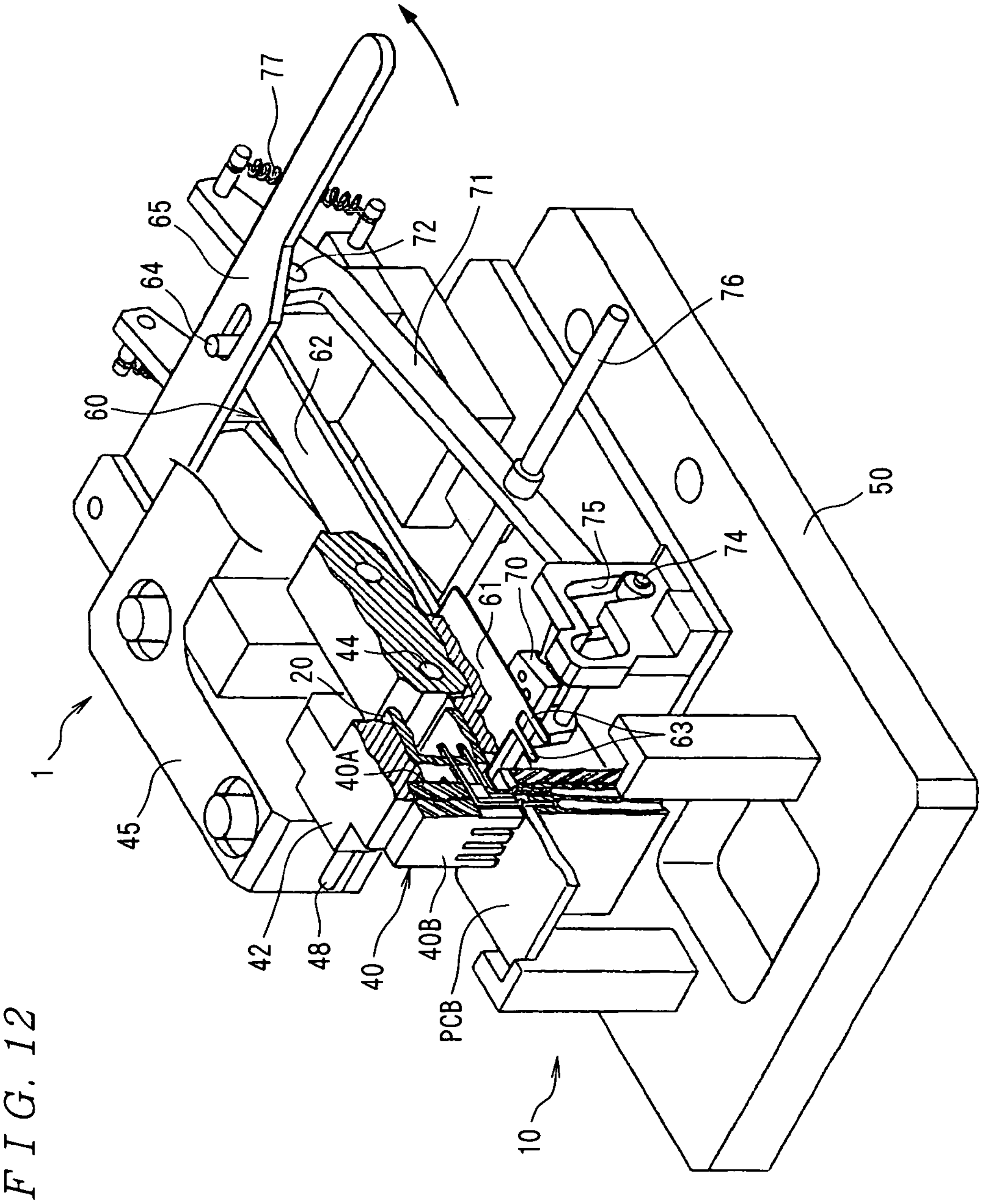
FIG. 12 is a partially sectional perspective view of the contact press-fitting apparatus of FIGS. 1-6 following press-fitting.
Figure 13:
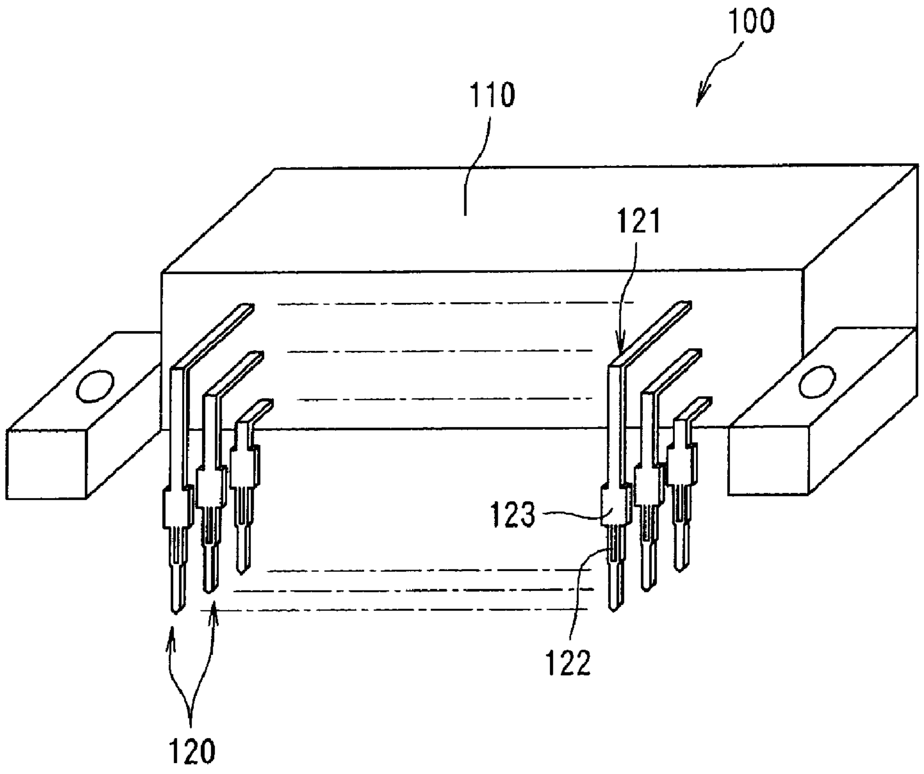
F I G. 13 (PRIOR ART)
FIG. 13 is a perspective view showing a conventional example of a contact press-fitting method.
Figure 14:
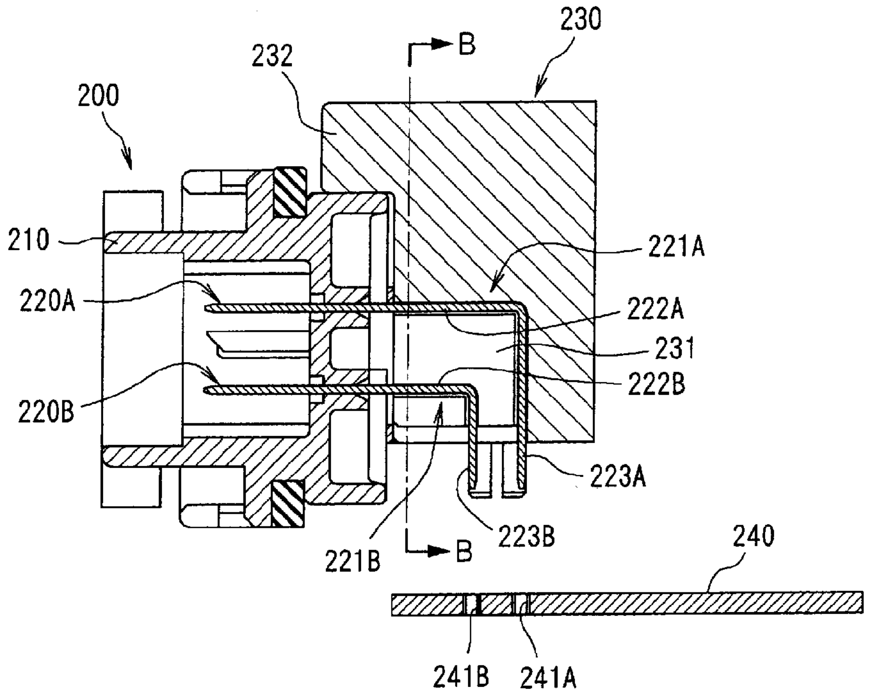
F I G. 14 A (PRIOR ART)
FIGS. 14A and 14B are partial sectional views of another conventional example of a contact press-fitting method.
Figure 14:
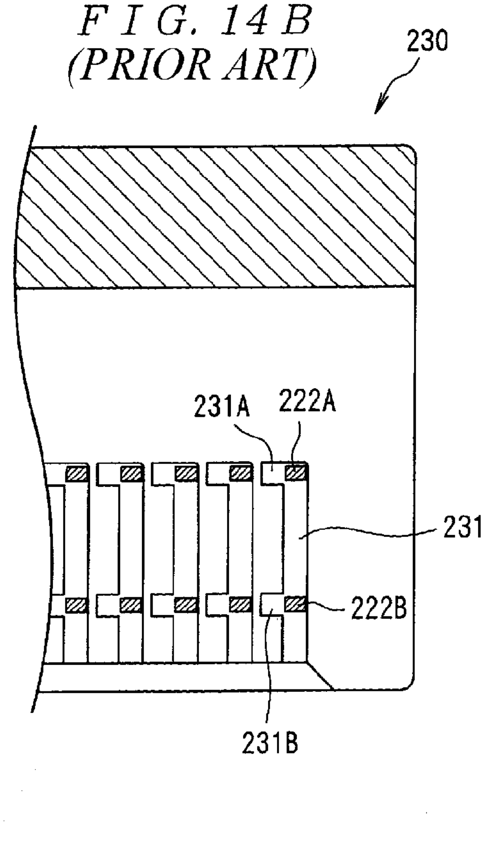
F I G. 14 B (PRIOR ART)

Accordingly, a supporting member 60 (see FIGS. 10, 11) is disposed on the upper base 45. Supporting member 60 is inserted into the press-fitting head 40 from a direction perpendicular to the press-fitting direction of the press-fitting head 40, and supports the side surfaces of the contacts $22_{11}$, $22_{12}$, $22_{23}$ and $22_{24}$ that are not contacted by the abutting parts 47, i.e., the side surfaces A of the contacts $22_{11}$, $22_{12}$, $22_{23}$ and $22_{24}$ on the sides of the wide longitudinal grooves (see FIG. 9), This supporting member 60 comprises a board 61 which can move in a direction perpendicular to the press-fitting direction on the connector carrier 30 (the left-right direction in FIG. 1), a link 62 which extends rightward perpendicular to the press-fitting direction from the board 61, and a plurality of supporting plates 63 (10 plates in the present embodiment) which extend leftward perpendicular to the press-fitting direction from the board 61, and which support the side surfaces A of the contacts $22_{11}$, $22_{12}$, $22_{23}$ and $22_{24}$ on the side of the wide longitudinal grooves. As is shown clearly in FIGS. 10 through 12, a supporting shaft 64 is formed so that this shaft protrudes upward from the right end portion of the link 62. An operating member 65 which can pivot in the direction indicated by the arrows shown in FIGS. 10 through 12 is connected to this supporting shaft 64, and the system is devised so that the link 62, board 61 and supporting plates 63 are caused to move in a direction perpendicular to the press-fitting direction by causing this operating member 65 to pivot.

Furthermore, a positioning plate 70 which performs positioning of the legs $23_{11}$, $23_{12}$, $23_{23}$, $23_{24}$, $23_{35}$ and $23_{46}$ when the respective contacts $22_{11}$, $22_{12}$, $22_{23}$, $22_{24}$, $22_{35}$ and $22_{46}$ are press-fitted in the board PCB is disposed in the vicinity of the connector carrier 30. This positioning plate 70 is fastened to the tip end of a link 71, and this link 71 is supported by a pivoting shaft 72 on a slide member 73 (see FIG. 1) that slides with respect to the base 50 in the left-right direction in FIG. 1, such that this link is free to pivot. The link 71 performs the action described below in accordance with a cam mechanism consisting of a cam pin 74 that is disposed on the link 71 and a cam groove 75 that is formed in a member fastened to the base 50. In FIG. 1, the positioning plate 70 is in the positioning position where this plate performs positioning of the legs $23_{11}$, $23_{12}$, $23_{23}$, $23_{24}$, $23_{35}$ and $23_{46}$ of the respective contacts $22_{11}$, $22_{12}$, $22_{2246}$. An operating rod 76 is disposed on the link 71, and a portion of the operation of the link 71 that is described below is performed by the operator operating this operating rod 76. Furthermore, following this operation, the link 71 is caused to return to the state shown in FIG. 1 by the action of coil springs 77 and the manual operation performed by the operator.

Next, the contact press-fitting method will be described with reference to FIGS. 1 through 12.

First, in the state shown in FIG. 1, a board PCB is placed on the board carrier 10; however, no connector is yet placed on the connector carrier 30. Furthermore, the press-fitting head 40 is in the resting position where this head is positioned above the upper base 45. Moreover, the supporting member 60 is positioned furthest to the right. Furthermore, the positioning plate 70 is positioned on the left side of the connector carrier 30 in a horizontal state (in the vertical direction) with the connector carrier 30.

In the state shown in FIG. 1, the connector 20 is placed on the connector carrier 30, and the legs $23_{11}$, $23_{12}$, $23_{23}$, $23_{24}$, $23_{35}$ and $23_{46}$ of the respective contacts $22_{11}$, $22_{12}$, $22_{23}$, $22_{24}$, $22_{35}$ and $22_{46}$ of the connector 20 are positioned by the positioning plate 70. Consequently, the state shown in FIG. 10 is produced.

Then, when the operating member 65 is pivoted from this state in the direction indicated by the arrow shown in FIG. 10, the supporting member 60 advances to the left perpendicular to the press-fitting direction, so that the respective supporting plates 63 support the side surfaces A of the contacts $22_{11}$, $22_{12}$, $22_{23}$ and $22_{24}$ on the side of the wide longitudinal grooves.

Next, the press-fitting head 40 is pivoted into the press-fitting position. As a result, the state shown in FIGS. 2 and 11 is produced. In this state, as is shown in FIG. 9, the legs $23_{11}$, $23_{12}$, $23_{23}$, $23_{24}$, $23_{35}$ and $23_{46}$ of the respective contacts $22_{11}$, $22_{12}$, $22_{23}$, $22_{24}$, $22_{35}$ and $22_{46}$ enter the longitudinal grooves 46 of the press-fitting head 40, and the abutting parts 47 abut against the shoulders 25 of the respective contacts $22_{11}$, $22_{12}$, $22_{23}$, $22_{24}$, $22_{35}$ and $22_{46}$ from above.

Figure 3:
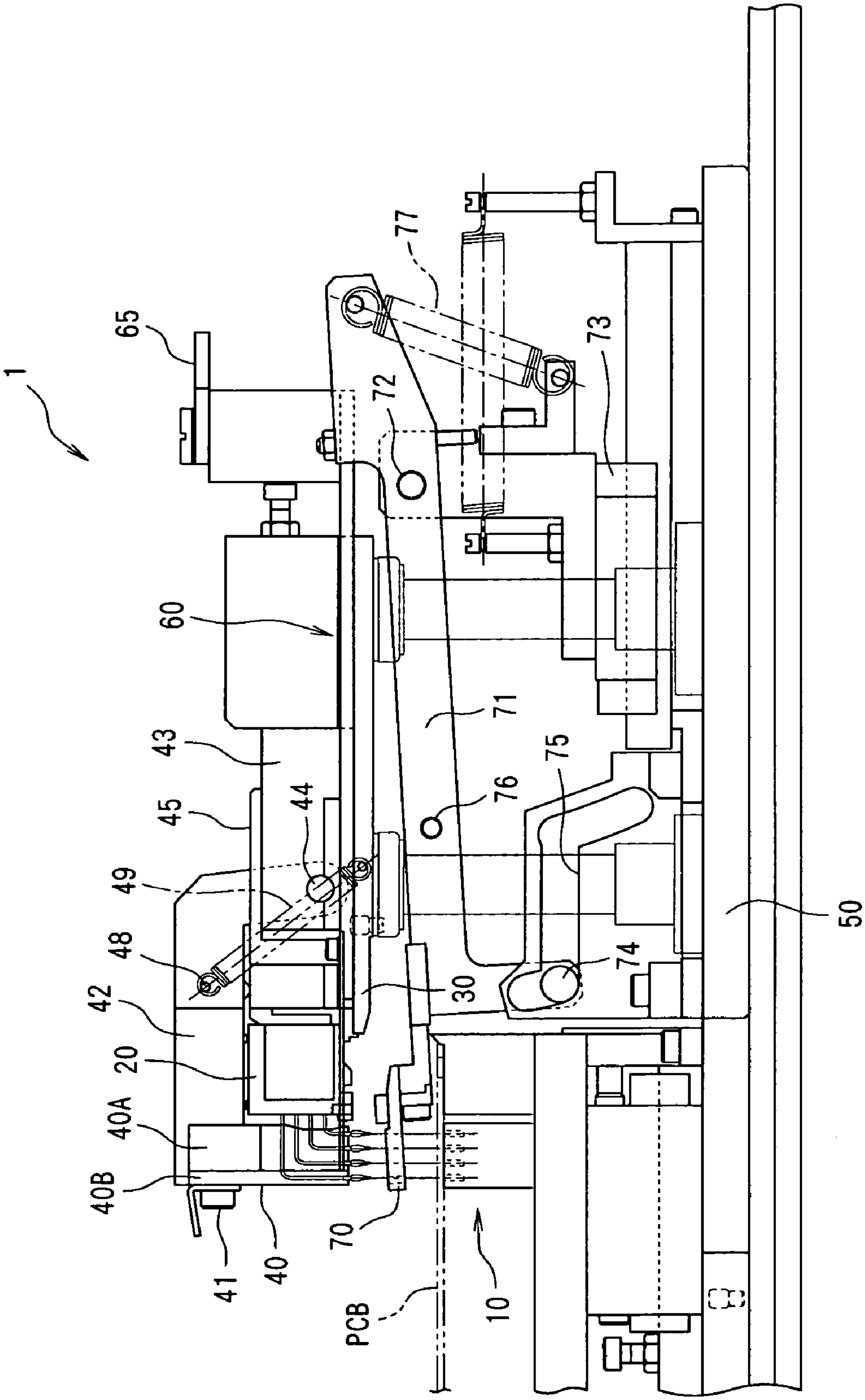
Figure 4:
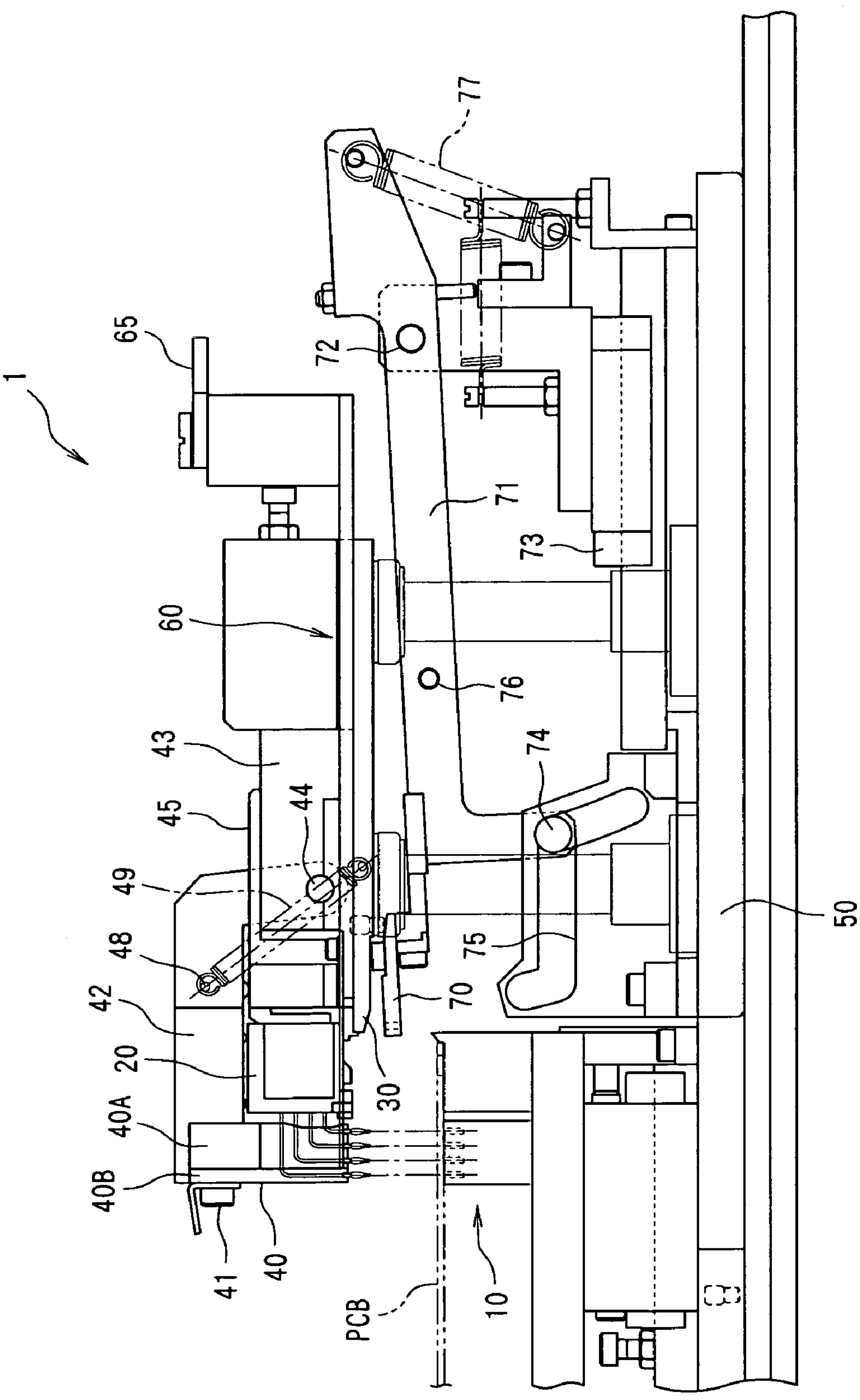

When the operating rod 76 of the link 71 is operated in the state shown in FIG. 2 in which the press-fitting head 40 has pivoted into the press-fitting position, the cam pin 74 of the link 71 moves along the cam groove 75, so that the positioning plate 70 is removed from the positioning position as shown in FIGS. 3 and 4. In this case, however, the legs $23_{11}$, $23_{12}$, $23_{23}$, $23_{24}$, $23_{35}$ and $23_{46}$ of the respective contacts $22_{11}$, $22_{12}$, $22_{23}$, $22_{24}$, $22_{35}$ and $22_{46}$ have already entered the longitudinal grooves 46 of the press-fitting head 40; furthermore, the supporting plates 63 are supporting the side surfaces A of the contacts $22_{11}$, $22_{12}$, $22_{23}$ and $22_{24}$ on the side of the wide longitudinal grooves, and the respective legs have been positioned. Accordingly, even if the positioning plate 70 is removed from the respective legs $23_{11}$, $23_{12}$, $23_{23}$, $23_{24}$, $23_{35}$ and $23_{46}$, the respective legs $23_{11}$, $23_{12}$, $23_{23}$, $23_{24}$, $23_{35}$ and $23_{46}$ remain in a positioned state. Furthermore, in the process extending from the state shown in FIG. 2 to the state shown in FIG. 4, the slide member 73 slides rightward in FIG. 4 with respect to the base 50, and the link 71 also slides together with the slide member 73; as a result, the movement of the cam pin 74 from the position shown in FIG. 2 to the position shown in FIG. 4 is made possible.

Figure 5:
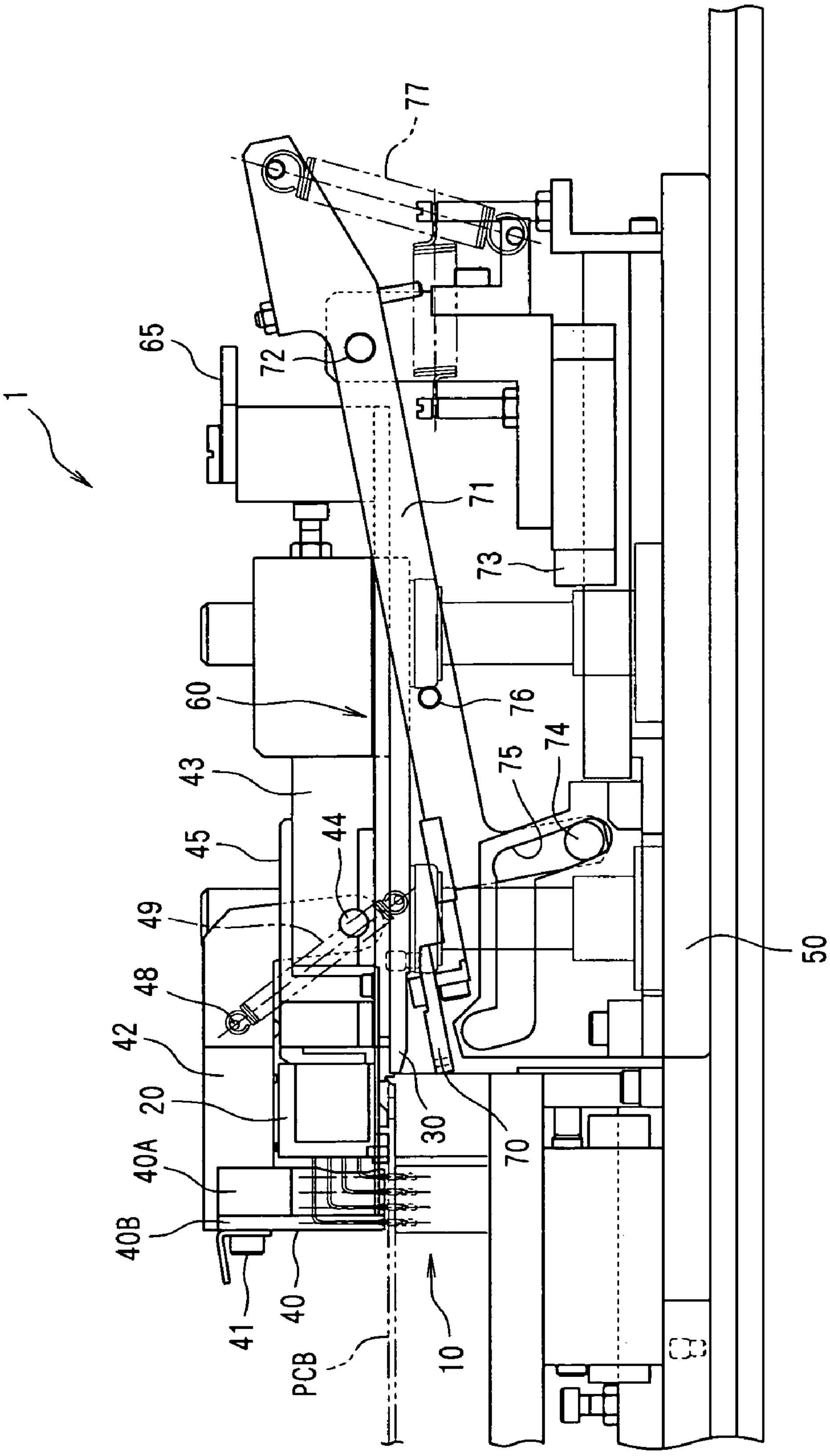
Figure 6:
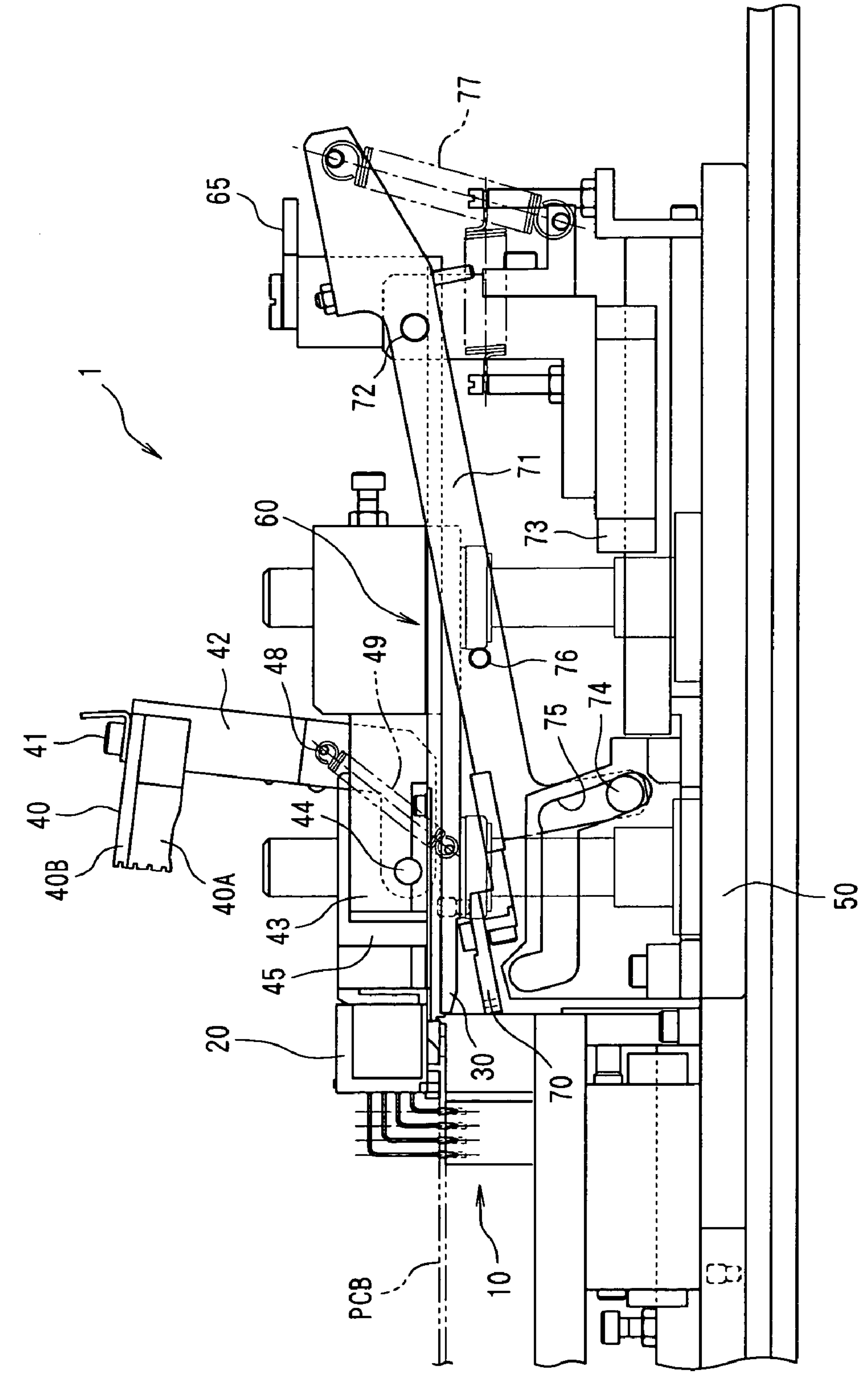

Furthermore, from the state shown in FIG. 4, the upper surface of the supporting arm 42 is pressed by the press-fitting press (not shown in the figures). Consequently, as is shown in FIGS. 5 and 12, the positioning plate 70 moves into the lower position as a result of contact with the undersurface of the connector carrier 30. Moreover, the supporting arm 42, supporting arm holder 43, press-fitting head 40 and upper base 45 are also pressed downward as shown in FIGS. 5 and 12. As a result of the press-fitting head 40 being pressed downward, the legs $23_{11}$, $23_{12}$, $23_{23}$, $23_{24}$, $23_{35}$ and $23_{46}$ of the contacts $22_{11}$, $22_{12}$, $22_{23}$, $22_{24}$, $22_{35}$ and $22_{46}$ are pressed downward, so that the press-fitting parts 24 of the respective contacts $22_{11}$, $22_{12}$, $22_{23}$, $22_{24}$, $22_{35}$ and $22_{46}$ are press-fitted in the press-fitting holes (not shown in the figures) of the board PCB. In this case, the abutting parts 47 of the press-fitting head 40 press the shoulders 25 of the respective contacts $22_{11}$, $22_{12}$, $22_{23}$, $22_{24}$, $22_{35}$ and $22_{46}$ from above. At the point in time of this press-fitting, the upper base 45 is locked in the position shown in the figures.

During this press-fitting, as is shown in FIG. 9, the respective supporting plates 63 of the supporting member 60 support the side surfaces A of the contacts $22_{11}$, $22_{12}$, $22_{23}$ and $22_{24}$ on the side of the wide longitudinal grooves; accordingly, even though there are no abutting parts 47 abutting the shoulders 25 on the side of the wide longitudinal grooves, the contacts $22_{11}$, $22_{12}$, $22_{23}$ and $22_{24}$ can be prevented from falling over, so that problems such as buckling of the respective contacts $22_{11}$, $22_{12}$, $22_{23}$ and $22_{24}$ can be prevented. Accordingly, even in cases where the contacts are disposed at an uneven array pitch, so that wide longitudinal grooves such as those described above must be formed, the press-fitting of all of the contacts can be accomplished with high reliability, without causing any problems such as buckling of the contacts.

Furthermore, when the operating member 65 is caused to pivot in the direction of the arrow shown in FIG. 12 from the state shown in FIGS. 5 and 12, the supporting member 60 retracts rightward perpendicular to the press-fitting direction, so that the supporting member 60 returns to the state shown in FIG. 1.

Subsequently, when the press-fitting press is raised, the press-fitting head 40 returns to the upper resting position as a result of the pivoting of the supporting arm 42. In this state, the board PCB and connector 20 following press-fitting are removed.

Subsequently, the locking of the upper base 45 is released, and the supporting arm holder 43, supporting arm 42, press-fitting head 40 and upper base 45 are caused to move as a unit to the upper position shown in FIG. 1 by the action of the coil springs 51 shown in FIG. 10. Afterward, the link 71 is caused to return to the original position shown in FIG. 1 by the action of the coil springs 77 and the operation of the operating rod 76 of the link 71 by the operator; as a result, the positioning plate 70 fastened to the tip end of this link returns to the positioning position. Once this return to the initial state shown in FIG. 1 is achieved, a new board is placed on the board carrier 10, the contacts of the next connector are press-fitted in this newly placed board, and this process is repeated in a cycle, so that boards with press-fitted connectors are completed one at a time.

An embodiment of the present invention has been described above. However, the present invention is not limited to this embodiment; various alterations and modifications are possible.

For example, with regard to the pivoting of the supporting arm 42 and the movement of the link 71, the motive force of a motor, etc., may be used instead of manual operation.

What is claimed is:

1. A contact press-fitting apparatus comprising:

a board carrier which carries a board;

a connector carrier which carries a connector having substantially L-shaped legs;

a press-fitting head which respectively positions and press-fits numerous press-fitting parts disposed in the vicinity of the lower end of the substantially L-shaped legs of the connector in the board, the press-fitting head having an abutting part that abuts against shoulders disposed on the upper sides of the press-fitting parts; and a supporting member which is inserted into the press-fitting head from a direction perpendicular to the press-fitting direction of the press-fitting head, and which supports side surfaces of the contacts on the sides that the abutting part does not abut against.

2. The contact press-fitting apparatus of claim 1, wherein the board carrier is mounted on a base, the connector carrier is mounted on an upper base connected to the base and movable in a direction parallel to the board carrier, and the press-fitting head is pivotally mounted on the upper base.

3. The contact press-fitting apparatus of claim 2, wherein the supporting member comprises a board slidingly disposed on the upper base, a link extending perpendicular to the press-fitting direction from the board away from the press fitting head in a press fitting position, and a plurality of supporting plates extending perpendicular to the press-fitting direction from the board towards the press fitting head in the press fitting position.

4. The contact press-fitting apparatus of claim 3, wherein the support member slides between a supporting position, in which the supporting plates support the side surfaces of one or more of the contacts, and a retracted position, in which the supporting plates are remote from the contacts.

5. The contact press-fitting apparatus of claim 4, wherein the link is operatively associated with an operating member, such that the link, the board, and supporting plates are moved in a direction perpendicular to the press-fitting direction by pivoting the operating member.

6. The contact press-fitting apparatus of claim 1, further comprising a positioning plate which performs positioning of the legs when the respective contacts are press-fitted in the board PCB.

7. The contact press-fitting apparatus of claim 6, wherein the positioning plate is disposed in the vicinity of the connector carrier.

8. The contact press-fitting apparatus of claim 7, wherein the positioning plate is fastened at a tip end of a link, the link being supported by a pivoting shaft on a slide member that slides with respect to the base.

9. The contact press-fitting apparatus of claim 7, wherein the link has a cam pin disposed thereon operatively associated with a cam groove formed in a member fastened to the base.

10. The contact press-fitting apparatus of claim 8, wherein the link pivots between a position wherein the positioning plate aligns with the board and a position wherein the positioning plate is remote from the board.

11. The contact press-fitting apparatus of claim 1, wherein the press-fitting head has a plurality of longitudinal grooves formed on an inside surface thereof at substantially the same pitch as the array pitch of the contacts.

* * * * *